United States Patent [19]

Richardson et al.

[11] 4,058,765
[45] Nov. 15, 1977

[54] GENERAL DISPLACEMENT SENSOR

[76] Inventors: David Richardson, 2588 Knights Bridge Lane, Santa Clara, Calif. 95051; Paul Kageyama, 418 Madera No. 1, Sunnyvale, Calif. 94086

[21] Appl. No.: 693,886

[22] Filed: June 7, 1976

[51] Int. Cl.² .......................................... G01R 27/26
[52] U.S. Cl. .............................. 324/61 R; 73/304 C; 331/65; 340/244 C
[58] Field of Search .............. 324/61 R, 61 P; 321/24; 73/462, 304 C; 331/65; 340/244 C; 317/246

[56] References Cited

U.S. PATENT DOCUMENTS

| 3,042,908 | 7/1962 | Pearson | 331/65 X |
| 3,392,349 | 7/1968 | Bartley | 331/65 |
| 3,486,108 | 12/1969 | Rosica et al. | 324/61 |
| 3,533,286 | 10/1970 | Westcott et al. | 324/61 R X |
| 3,553,575 | 1/1971 | Shea | 324/61 R |
| 3,651,505 | 3/1972 | Schmidt | 324/61 R X |
| 3,710,244 | 1/1973 | Rauchwerger | 324/61 R |
| 3,868,664 | 2/1975 | Hill | 73/304 C X |
| 3,897,798 | 8/1975 | De Vale | 324/61 R |

OTHER PUBLICATIONS

Capacitive Transducers by Foldvari et al., Instruments & Control Systems, Nov. 1964, vol. 37, pp. 77-84.

Primary Examiner—Rudolph V. Rolinec
Assistant Examiner—Vincent J. Sunderdick

[57] ABSTRACT

General resistive and capacitive circuitry for sensing and displaying liquid or powder level in a container, linear or rotational displacement of a body, ambient moisture content of the atmosphere, and similar physical quantities, using substantially the same circuitry for each such quantity.

40 Claims, 11 Drawing Figures

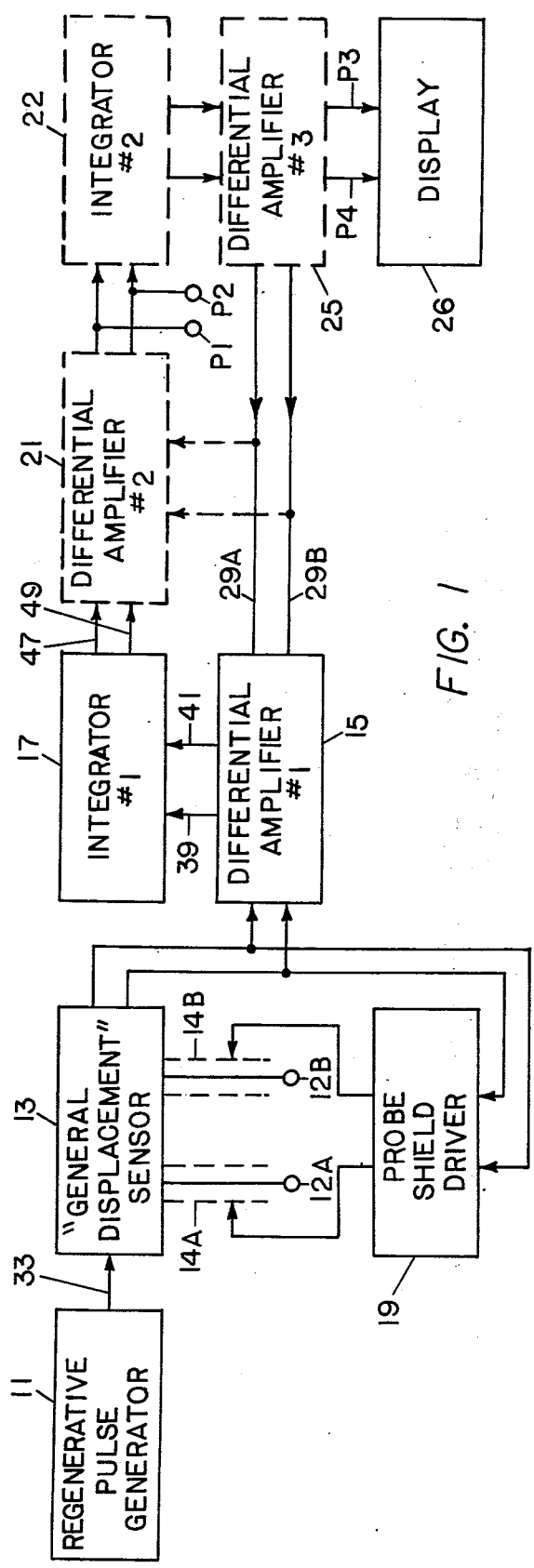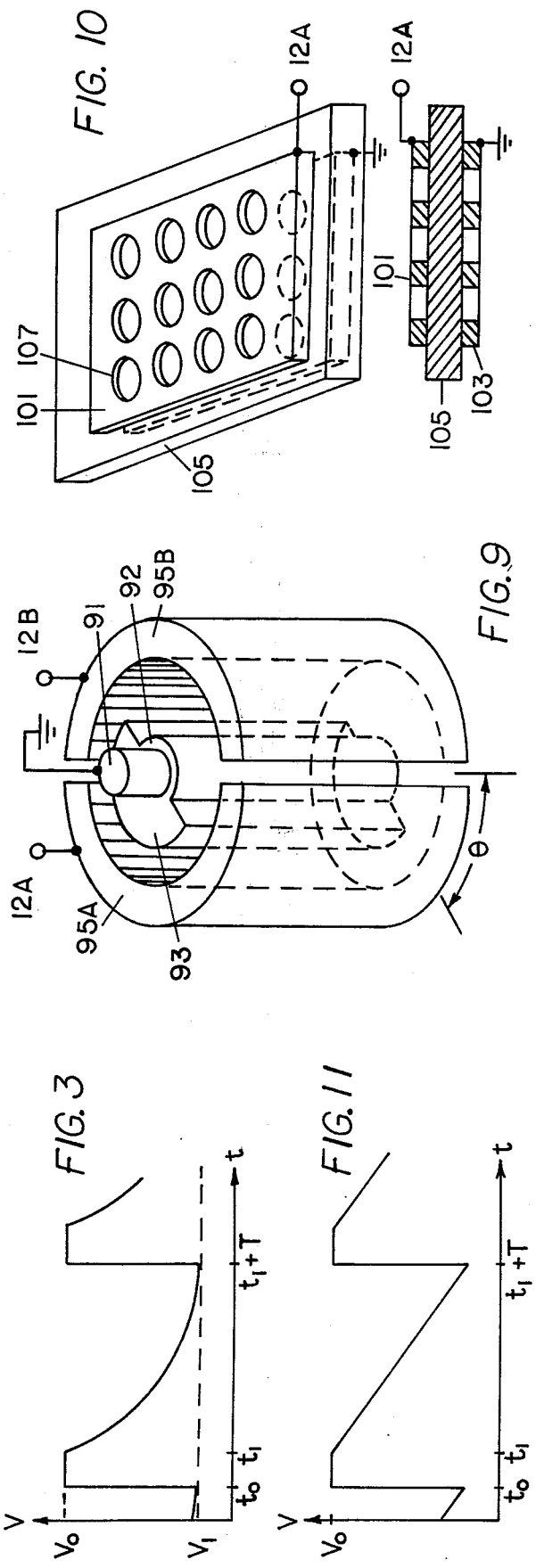

GENERAL DISPLACEMENT SENSOR

FIELD OF THE INVENTION

The subject invention pertains to resistive-capacitive circuitry for detecting the level of liquid or powder in a container, linear displacement or rotational displacement of a movable body, ambient moisture content of the environment and similar quantities.

BACKGROUND OF THE INVENTION

Capacitance-responsive probes, wherein a capacitance sensor develops a capacitance which is a measure of liquid level, displacement, moisture content or other similar quantities, are a well-known art. An example is U.S. Pat. No. 3,831,069 to Merrell et al. which discloses a level detecting probe with electrical circuitry enclosed in the probe housing. The Merrell disclosure does not contemplate the use of the circuitry associated with the probe for purposes other than liquid level sensing, nor does Merrell disclose the use of a compensator to handle extraneously-produced capacitance in the measurement and reference signals. The circuitry of Merrell et al. merely provides a signal indicative of threshold liquid level, not a signal indicative of the height of liquid level. A fortiori, Merrell et al. does not teach the use of circuitry to produce an output signal which is substantially linearly proportional to the capacitance or differential capacitance sensed by the probe or probes. Neither do any of the other patents cited and discussed below (except Wallman and DiNiro) produce an output signal varying substantially linearly with "sensed" capacitance.

Another example is U.S. Pat. No. 3,805,150 to Abbe, which teaches the use of two axially displaced probe tips to measure displacement or standoff distance of one probe tip (the nearest) from a grounded conducting surface. Again, the Abbe specification contemplates use of the invention for measurement of a single type of quantity (displacement), although compensation for some sources of extraneous capacitance is included.

U.S. Pat. No. 3,728,897 to Wallman discloses a temperature sensing and density (or mass) sensing gauge for liquid fuel which uses fuel temperature and capacitance of the fuel as measured intermediary quantities. Compensation is provided for variations in fuel temperature as it affects capacitance of the fuel. Although Wallman's output signal varies nearly linearly with capacitance, no compensation for extraneous capacitance is provided.

The DiNiro Patent, U.S. Pat. No. 3,626,287, discloses a probe which measures capacitance change, with compensation provided for the presence of stray capacitances, which is suitable for measuring linear displacement between two or more movable capacitative plates. The DiNiro compensator is a specially wound transformer with low primary to secondary leakage capacitance. DiNiro discusses and explicitly rejects a method closely related to the compensation method of the subject invention, namely a shield driver which drives the potential of each probe shield to match that of the inner conducting wire of the corresponding probe. DiNiro does not use a balancing or reference probe against which measured capacitance is compared.

U.S. Pat. No. 3,300,718 to Umphrey discloses use of a shield driver to reduce distributed capacitance of the probe cables which carry the probe signal, as does U.S. Pat. No. 3,619,742 to Rud.

U.S. Pat. No. 3,582,728 to Thoma discloses a moisture or humidity sensing element, comprising a moisture-sensitive dielectric core which has moisture-permeable electrode layers bonded to each of two opposite surfaces of the core. No provision is made for compensation of extraneously-introduced capacitance, the electrode layers must be water-permeable and the device is suitable only for sensing one type of physical quantity, viz. moisture content. U.S. Pat. No. 3,350,941 to Misevich et al. is similar in approach to Thoma.

Another moisture content sensor, disclosed in U.S. Pat. No. 3,523,255 to Goodman et al., uses an aluminum base and a thin, electrically conducting metallic layer as electrodes and a thin, porous layer of aluminum oxide as the moisture-absorbent dielectric therebetween. The device is evidently useful only for measurement of moisture content, and no extraneous capacitance compensation is included.

Moffatt, in U.S. Pat. No. 3,405,559, discloses a pressure sensing element, whereby differential pressure on one capacitive membrane or thin plate causes the membrane to deform towards or away from a second initially parallel capacitive plate and so change the capacitance of the two plates by a measurable amount. No extraneous capacitance compensation or alternative uses are disclosed.

It is an object of the invention herein described to provide apparatus for sensing "general displacement" (as defined herein), the apparatus comprising pulse generation means, resistive-capacitive circuit means including a probe for producing a signal indicative of "general displacement," second resistive-capacitive circuit means for producing a reference "general displacement" signal, integration means for the two signals, amplification means for each signal, shield driver means for shielding the probe of the first resistive-capacitive circuit means from extraneous capacitance effects, and output means for producing a signal varying as a mathematical function of the "general displacement" sensed by the probe.

Other objects, features and advantages of the invention will become apparent from reference to the following drawings and detailed description.

BRIEF DESCRIPTION OF THE DRAWINGS

FIG. 1 is a schematic overview of apparatus for sensing "general displacement" (as defined herein), showing the flow of information.

FIG. 3 shows the voltage response at nodes 37 and 38 to an input pulse sequence.

FIG. 9 shows schematically a rotational displacement probe used to sense rotational displacement of an object which is constrained to rotate around a fixed axis.

FIG. 10 shows schematically a displacement probe used to sense ambient moisture content.

FIG. 11 shows the voltage response at nodes 37 and 38 to an input pulse sequence with the "general displacement sensor" circuit 13 in FIG. 2 replaced by the circuit 13' of FIG. 8.

DETAILED DESCRIPTION

Figure 2:
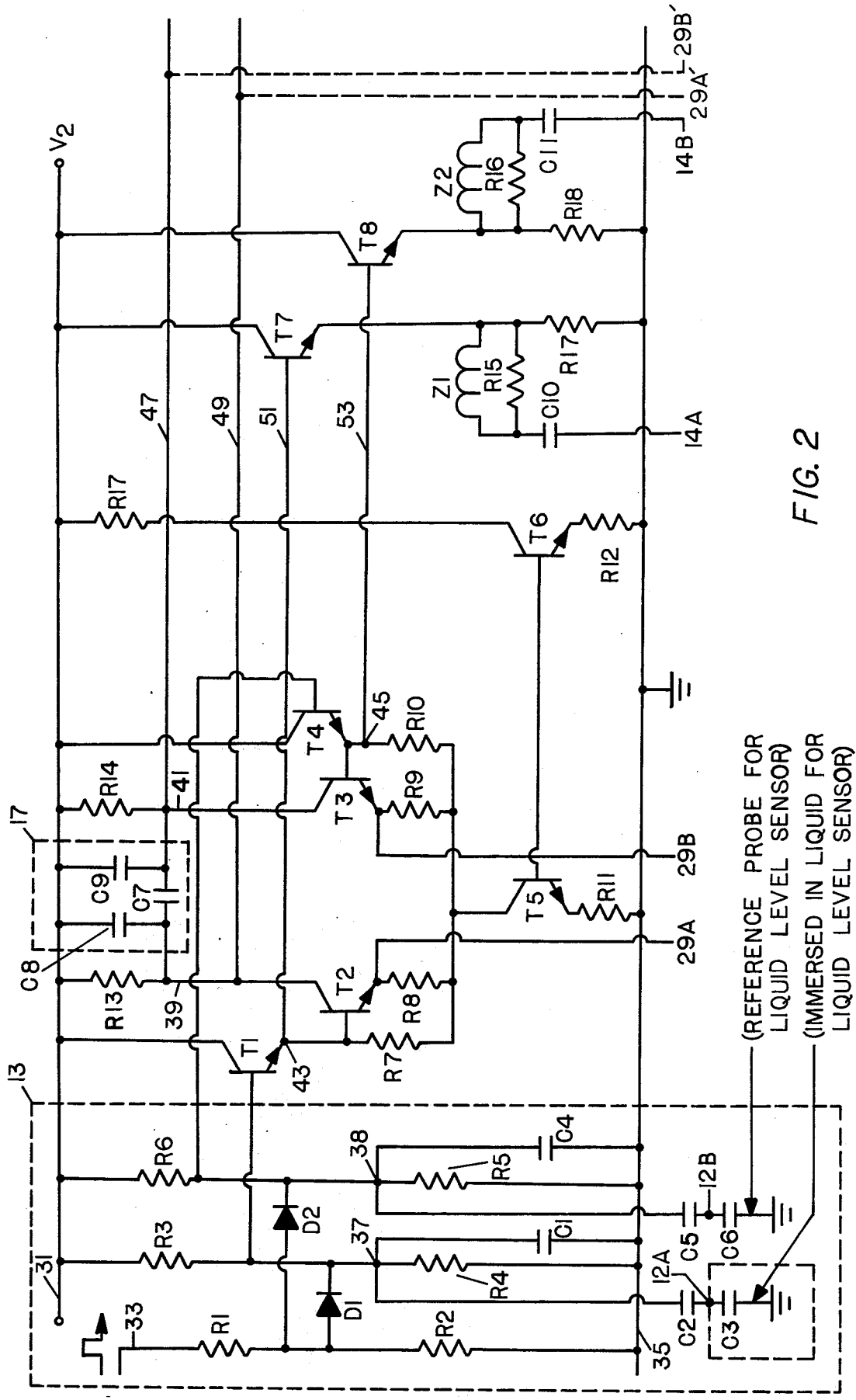
FIG. 2 shows circuit details for the "general displacement" sensor, first differential amplifier, integrator and probe shield driver, particularized to perform the functions of a liquid level sensor.

With reference to FIG. 1, a uniformly spaced sequence of pulses is produced by a regenerative pulse generator 11, which may be of conventional design. The output voltage pulses are passed along 33 to the "general displacement" sensor 13 and cause the displacement probes 12A and 12B to interrogate the active medium at the beginning of each pulse interval, typically $10^4 - 10^6$ times per second. As used herein, the term "general displacement" sensor is taken to mean:

1. a circuit which measures the absolute linear or rotational displacement of an object; or
2. a circuit which measures the level of liquid or powder (hereinafter called the "pourable material" level) in a container; or
3. a circuit which measures the ambient moisture content of the local environment; or
4. a circuit which measures any other physical quantity by use of one or two probes which interrogate the active medium by means disclosed herein.

The term "probe" is taken to mean a variable capacitance device used to interrogate the active medium. The active medium might be a conducting bar or plate whose capacitance varies substantially linearly or inversely with linear displacement; or a conducting or non-conducting liquid or powder with a fixed probe immersed therein with probe capacitance varying substantially linearly with liquid or powder level (hereinafter, pourable material level); or a moisture-absorbent block of dielectric material (e.g., a sponge) with two electrically conducting plates spaced a fixed distance apart within the material, where the capacitance of the dielectric varies directly with moisture content of the material.

The signals sensed by each probe 12A and 12B (which may each be the terminus of a three-conductor cable) during the same interval are input separately to the first differential amplifier 15 and then to an integrator 17 which integrates the signal difference over each pulse interval to obtain a voltage difference which varies approximately linearly with the difference of capacitances associated with the two probes. These probe signals are also input to a probe shield driver circuit 19 which forces the inner shield potential (one or both probes) to follow the potential of the central wire of the corresponding probe so as to reduce or eliminate any extraneous capacitance which might otherwise arise. The amplified and integrated signals are passed from 15 to a second stage gain circuit 21. At this point, the resulting signals may be picked off at the outputs $P_1$ and $P_2$; or said signals may be input to a third stage gain circuit 25 and the resulting signals picked off at the outputs $P_3$ and $P_4$. In order to reduce distortion, appropriate transistor signals from the last amplification stage are fed back along lines 29A and 29B to the first amplifier stage as shown; optionally, said signals may instead be fed back to the second amplifier stage.

Amplifier stage #2, integrator #2 and amplifier stage #3 are each optional and are therefore shown in dotted lines in FIG. 1. Each of these three circuits may be added or deleted independently of the other two. Where both amplifier stages 21 and 25 are deleted, the signals appearing on lines 47 and 49 may be too weak to drive the display device, 26, (connected to $P_3$ and $P_4$ as shown in FIG. 1 or, alternatively, to $P_1$ and $P_2$ or, alternatively, to 47 and 49). The second integrator 22 acts to further smooth the signals received on lines 47 and 49.

With reference to FIG. 2, a sequence of uniformly spaced pulses ($10^4 - 10^6 \text{sec}^{-1}$) arrives on line 33 from the pulse generator 11. A fraction of the positive-going voltage of each pulse, determined by the voltage divider $R_1$ and $R_2$, is passed by diode $D_1$ (alternatively, $D_2$) through the resistive-capacitive circuit comprising $R_3$, $R_4$, $C_1$, $C_2$, $C_3$ (alternatively, $R_5$, $R_6$, $C_4$, $C_5$, $C_6$) to generate at nodes 37 and 38 RC circuit decay voltages indicative of the capacitances sensed at $C_3$ and $C_6$ (FIG. 3). The particular embodiment of FIG. 2 is an apparatus for sensing pourable material level in a container. Capacitor $C_3$ is immersed in the material in such a manner that the capacitance varies directly with the height h of pourable material between inner and outer probes, viz.

Capacitance $C_3 \propto h$

The voltage $V_{37}$ appearing at node 37 is shown in FIG. 3. Over the time interval $t_0 < t < t_1$, corresponding to the peak positive part of each pulse at 33, the voltage is constant ($V_{37} = V_0$). During the interval $t_1 < t < t_1 + T$ corresponding to the minimum or negative part of each pulse at 33, the voltage decays as $$V_{37} = V_1 + (V_0 - V_1) e^{-a_3(t - t_1)}, (t_1 < t < t_1 + T)$$

$$a_3 = \frac{1}{R_4' C}, R_4' = \frac{R_3 R_4}{R_3 + R_4},$$

where $V_1$ is a bias voltage and the capacitance $$C ( = \frac{C_2 C_3}{C_2 + C_3} + C_1 \approx C_3 + C_1)$$

is indicative of the capacitance at $C_3$. A similar voltage $V_{38}$ appears at node 38, viz.

$$V_{38} = V_1 + (V_0 - V_1) e^{-a_6(t - t_1)}, (t_1 < t < t_1 + T)$$

$$a_6 = \frac{1}{R_5' C'}, R_5' = \frac{R_5 R_6}{R_5 + R_6}$$

where the capacitance $$C' ( = \frac{C_5 C_6}{C_5 + C_6} + C_4 \approx C_6 + C_4)$$

is indicative of the reference capacitance at $C_6$. By reversing the polarity of $V_2$ and the diodes in FIGS. 2, 4 and 5 and replacing all npn (pnp) transistors by pnp (npn) transistors a node response of the form $$V_{37}(\text{or } V_{38}) = V_1 - (V_1 - V_0) e^{-a(t - t_1)}, (t_1 < t < t_1 + T),$$

is obtained in which the voltage at nodes 37 and 38 increases to its bias value $V_1$ as $t \to \infty$.

The amplified signals are individually smoothed by the action of the capacitors $C_8$ and $C_9$. The capacitor $C_7$ acts to smooth (by integration) or limit the difference of the signals on 47 and 49. The circuit parameters of the two probe circuits are identical, in the sense that $R_3/R_4 = R_6/R_5$ and $CR_4' = C'R_5'$ only if the pourable material height h is equal to some reference value such as zero. The identical capacitors $C_2$ and $C_5$ are inserted to prevent DC current damage to the network in case $C_3$ and $C_6$ is shorted out. The foregoing considerations and the associated apparatus apply equally well to measurement of the height or level of liquid or powder in a container.

The voltages $V_{37}$ and $V_{38}$ are passed to the first stage differential amplifier 15 as shown, and the difference voltage is integrated at 17 to yield a signal proportional to:

$$\int_{t_1}^{t_1 + T} [V_{37}(t) - V_{38}(t)] \, dt =$$

$$(V_0 - V_1) R_4'(C - C') + R_4'(Ce^{-\alpha_6 T} - C'e^{-\alpha_3 T})$$

This last signal is approximately linearly related to the quantity C - C' and thus to "general displacement," when used with a probe whose capacitance is linearly related to "general displacement." With reference to the signal waveforms in FIG. 3 applied to the capacitors C and C' it has been found that optimum linearity of the output voltage of the circuit, with respect to changes being measured by the circuit, results when a particular relationship exists between the active or non-constant period of the waveform (T), the exponent, $\alpha$, in the expressions for $V_{37}$ and $V_{38}$, and the peak to peak voltage, $(V_0 - V_1)$, of said active period. This optimum relation is $$K = \frac{2T}{(\frac{1}{\alpha_{max}}) + (\frac{1}{\alpha_{min}})}$$

where K is the number between 2 and 4, called the period coefficient. Here $\alpha_{max}$ and $\alpha_{min}$ are the maximum and minimum values, respectively, of the exponent $\alpha$ as the capacitances C, C' and varied over their allowed range of values.

Figure 7:
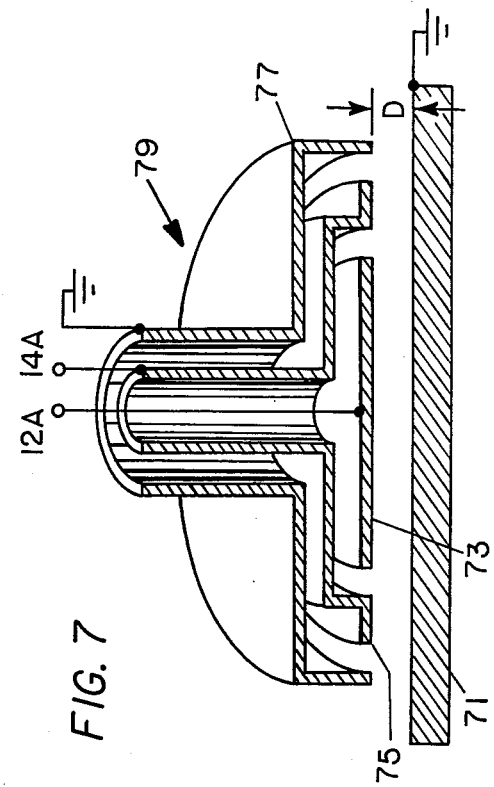
FIG. 7 shows schematically an alternative linear displacement sensing apparatus used to sense linear displacement of a probe with respect to the surface of an object parallel to the bottom face of the probe.

Alternatively, when a probe is used whose capacitance is inversely proportional to "general displacement," such as shown in FIG. 7, the circuit 13' shown in FIG. 8 (discussed below) may replace the "general displacement" sensor 13 in FIG. 2; this results in signals at node 37 and 38 whose difference when integrated by 17 is approximately proportional to displacement.

The signal at node 37 (alternatively, node 38) is passed through transistors T1 and T2 (alternatively, transistors T3 and T4) which form part of the differential amplifier 15, which is of conventional design. None of the transistors is operated at saturation. The resulting amplified signals are passed along 39 and 41 to the integrator 17, comprising capacitors C7, C8 and C9 as shown. The amplified signals are individually smoothed by the action of the capacitors C8 and C9. The capacitor C7 acts to smooth (by integration) the difference of the signals on 47 and 49. The signals $V_{39}$ and $V_{41}$, produced by the first stage amplifier 15, are also passed along lines 47 and 49, respectively, to the second stage amplifier 21. Signals $V_{39}$ and $V_{41}$ are additive inverses of one another in the sense that $V_{39} - V_B = -(V_{41} - V_B)$ where $V_B$ is the average value of the voltages $V_{39}$ and $V_{41}$.

The signal $V_{43}$ at node 43 is carried along line 51 to a transistor $T_7$ for further amplification. The resulting $T_7$ emitter voltage is passed to shield driver 14A through a "glitch killer" comprising an inductance Z1 and resistor $R_{15}$ in parallel, with a drain to ground through resistor $R_{17}$. Transistor $T_7$ forces the inner shield potential on probe 12A to follow the potential of the central wire of the same probe, thus depressing any induced capacitance effects associated with a potential difference therebetween. The "glitch killer" circuit (Z1 and R15) substantially reduces the magnitude of any high frequency signal appearing at the emitter of T7.

In a similar manner, the signal $V_{45}$ appearing at node 45 is carried along line 53, through transistor T8 and through another "glitch killer" circuit (Z2 and R16 in parallel), with a drain to ground through R18, and thence to shield driver 14B to force the inner shield potential of probe 12B to follow the potential of the central wire of probe 12B. Capacitors C10 and C11 protect the shield drivers 14A and 14B from damage due to shorting out of the circuit.

Figure 4:
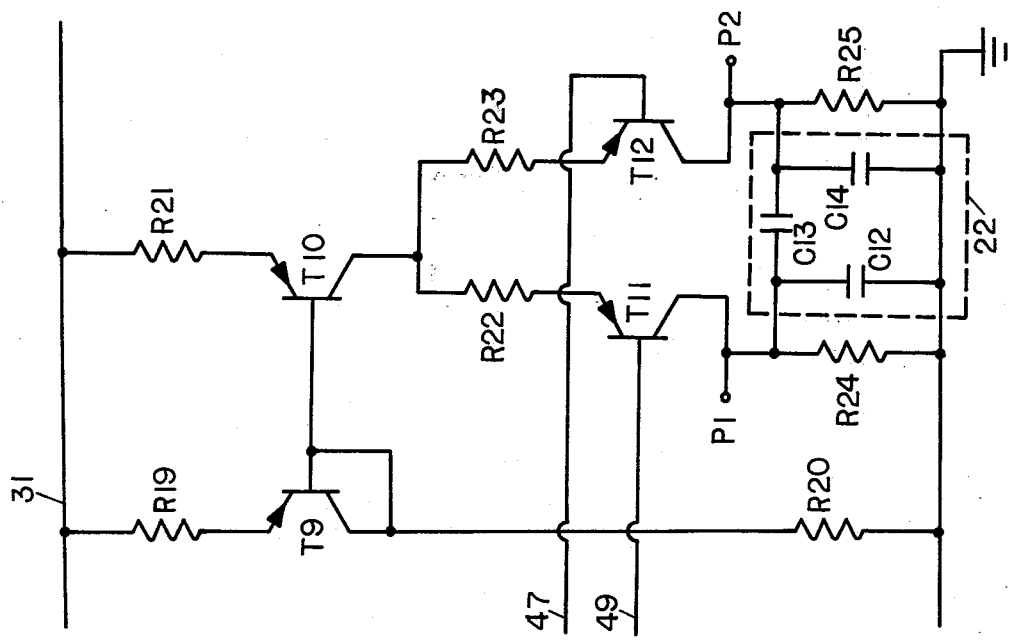
FIG. 4 shows circuit details of the second stage differential amplifier.

FIG. 4 exhibits the second stage amplifier and an associated integrator circuit 22 (comprising capacitors C12, C13, and C14). Individually smoothed collector voltage signals from T2 and T3 arrive on lines 49 and 47, respectively, and are passed to transistors T12 and T11 of the amplifier which act in a manner analogous to T2 and T3. The collector voltages (individually smoothed by action of the capacitors C12 and C14 and differential capacitor C13) of the transistors T11 and T12 may be picked off at P1 and P2, respectively, for visual display of the amplified signals indicative of the capacitances C3 and C6, respectively. If the apparatus senses pourable material height in a container, then the difference of the signals at P2 and P1 is approximately linearly proportional to material height.

Figure 5:
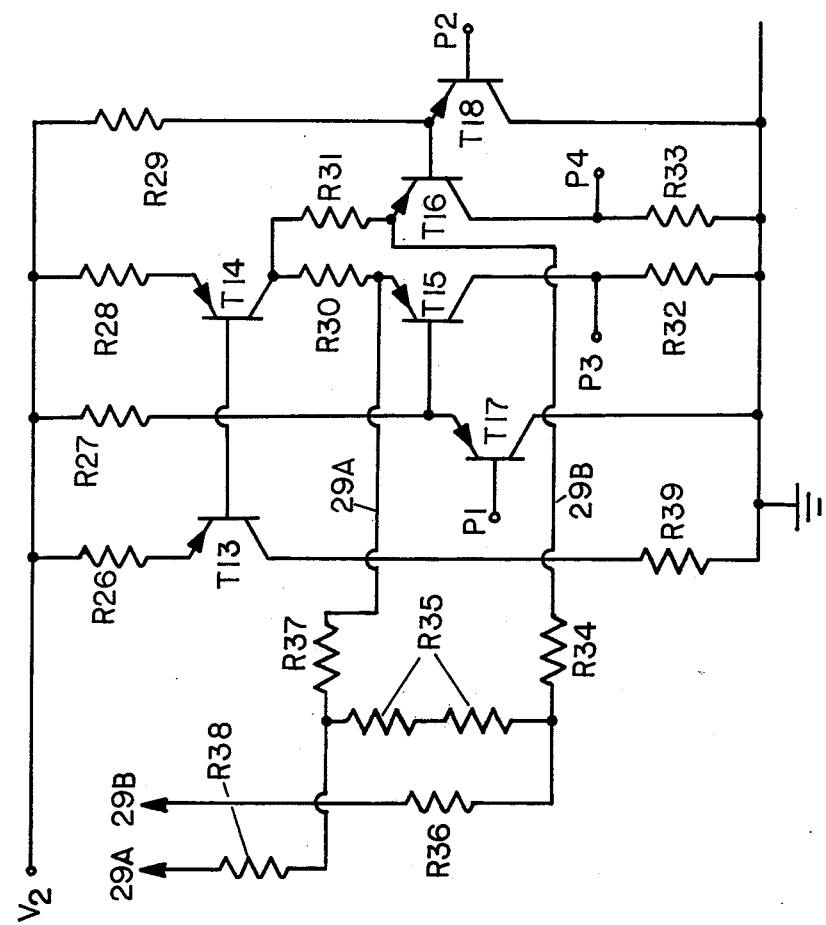
FIG. 5 shows circuit details of the third stage differential amplifier and feedback.

The signals appearing at P2 and P1 may instead be input to transistors T18 and T17, respectively, which are part of the third stage amplifier circuit 25, as shown in FIG. 5. The emitter signals at T17 and T18 are in turn input to the bases of transistors T15 and T16, respectively, producing currents in the load resistors R32 and R33, respectively. Output voltages at P3 and P4 develop in response to the currents produced in R32 and R33, respectively. The outputs P3 and P4 may be used to drive an output device 26 for display of the voltage as a mathematical function (e.g., linear or $n^{th}$ power or inverse) of the pourable material level in the container.

A feedback path 29A, including resistors R37 and R38 carries the emitter signal at T15 back to the emitter of transistor T2. Similarly, a feedback path 29B, including resistors R34 and R36, carries the emitter signal at T16 back to the emitter at transistor T3. These (negative) feedback signals act to stabilize the gain and signal amplitudes on lines 47 and 49 and throughout the remainder of the loop. As a first alternative embodiment, the feedback signals may be carried along lines 29A and 29B, respectively, (shown in FIG. 1), to the second stage amplifier inputs at lines 49 and 47, respectively. This first alternative embodiment may be advantageously used when the feedback signals carried along lines 29A and 29B are so large that the DC components of the currents in lines 29A and 29B significantly alter the optimum bias points of T2 and/or T3, and the common mode rejection is degraded.

The value of resistor R35 may be adjusted to increase or decrease the differential gain of the circuit to a desired value.

A second alternative embodiment results from connecting the feedback path 29A to the collector of T16 (rather than to the emitter of T15) and connecting the feedback path 29B to the collector of T15 (rather than to the emitter of T16), with the same effect. As a third alternative embodiment, modifications of the first and second alternative embodiments may be combined; this achieves a low output impedance at P3 and P4.

Figure 6:
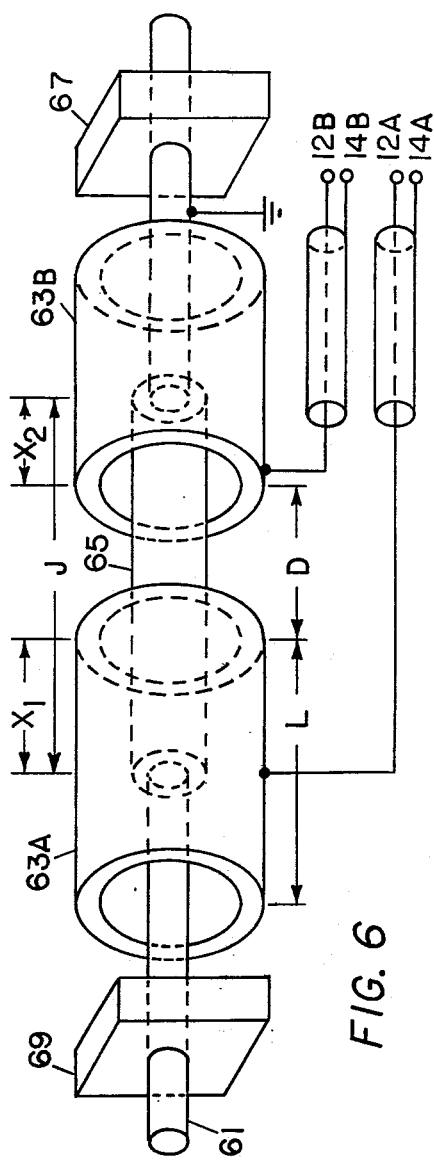
FIG. 6 shows schematically a linear displacement probe for sensing displacement of an object constrained to move in only one linear direction.

FIG. 6 shows an alternative embodiment, used to determine linear displacement of an object which is constrained to move back and forth in only one linear direction. An electrically grounded conducting rod 61 is coaxial with two aligned, hollow cylinders 63A and 63B, each of length L and longitudinally spaced apart a distance D, the cylinders being constructed of an electrically conducting material such as iron. A cylindrical sleeve 65 of length J, with $J = D + L$, is fitted over the rod 61 at the rod mid-portion, the sleeve also being constructed of an electrically conducting material and being electrically connected to the rod 61. The outer diameters of rod 61 and sleeve 65 are less than the inner diameter of the cylinders 63A and 63B, and the rod-and-sleeve combination is constrained to move only in the longitudinal direction of the cylinders 63A and 63B by two coaxial rod guides 67 and 69, spaced apart from the extreme ends of the cylinders as shown in FIG. 6.

Probe wires 12A and 12B are electrically connected, respectively, to the cylinders 63A and 63B, the other ends of the probe wires being connected to the capacitors C2 and C5 of the circuit of FIG. 2 as shown therein. The coaxial cylinders 63A and 63B and the sleeve 65 play the role of and replace capacitors C3 and C6 in FIG. 2. The probe wires 12A and 12B are surrounded for most of their length by driven shields 14A and 14B, respectively, which are part of the shield drivers whose action was discussed above in connection with FIG. 2.

The rod-and-sleeve combination 61 and 65 (FIG. 6) moves longitudinally back and forth along the axis of the cylinders 63A and 63B, in response to some force; and as this occurs the capacitance between each cylinder and the sleeve increases approximately linearly with the length of the portion of the sleeve within the cylinder, by a well-known interaction:

$$C \propto X_1 \text{ (Cylinder 63A)}$$

or $$C \propto X_2 \text{ (Cylinder 63B)}.$$

As the capacitance between sleeve 65 and cylinder 63A increases, the capacitance between sleeve 65 and cylinder 63B decreases by the same amount, and conversely. The difference of the two capacitances, as sensed by the probe wires 12A and 12B, thus also increases or decreases approximately linearly with the longitudinal displacement of the rod-and-sleeve combination within the cylinders 63A and 63B, while the sum of the capacitances sensed is nearly constant. Little or no capacitance "end effects" are manifest where the difference of the two capacitances is considered. The probe wires 12A and 12B are electrically connected through capacitors C2 and C5 to the entire circuit as shown in FIG. 2, and said circuit performs as described above.

FIG. 7 shows a second alternative embodiment of the invention sensing apparatus, wherein the linear displacement of an object is determined by a different approach. A first electrically conducting flat plate 73 is parallel to but spaced apart from an electrically grounded, flat, conducting plate 71 as shown in the sectional view of FIG. 7. The plates 71 and 73 are spaced apart by distance D, and they play the role of the capacitor C3 of FIG. 2; the capacitance between plate 71 and 73 is substantially proportional to 1/D, the inverse of gap spacing. A driven shield 75, also constructed of electrically conducting material and electrically connected to shield driver lead 14A appearing in FIG. 2 surrounds the plate 73 on all sides except the side exposed to and parallel to the grounded plate 71. The driven shield 75 acts to eliminate the development of any extraneous potential or associated extraneous capacitance on the plate 73. Finally, another shield 77, also constructed of electrically conducting material and grounded, surrounds the shield 75 and plate 73 as shown to further reduce or eliminate the development of any extraneous potential on the plate 73. This driven shield arrangement causes the capacitance associated with terminal 12A to be substantially the capacitance existing across the gap between plates 71 and 73.

The place 73, held parallel to the plate 71, is caused to more toward or away from plate 71 by some external force. The capacitance associated with the terminal or lead at 12A increases or decreases directly with 1/D and thus varies inversely with linear displacement of the plate 73. A second displacement sensing apparatus, similar to the apparatus 79 of FIG. 7, is constructed (not shown) wherein the conducting plate (analogous to 73) is held fixed so that the gap spacing (analogous to D) does not change; this second apparatus might be replaced by a fixed capacitor of appropriate magnitude. The capacitance associated with the corresponding terminal or lead 12B (not shown, but analogous to 12A) is thus fixed, and said capacitance functions as a reference capacitance.

Figure 8:
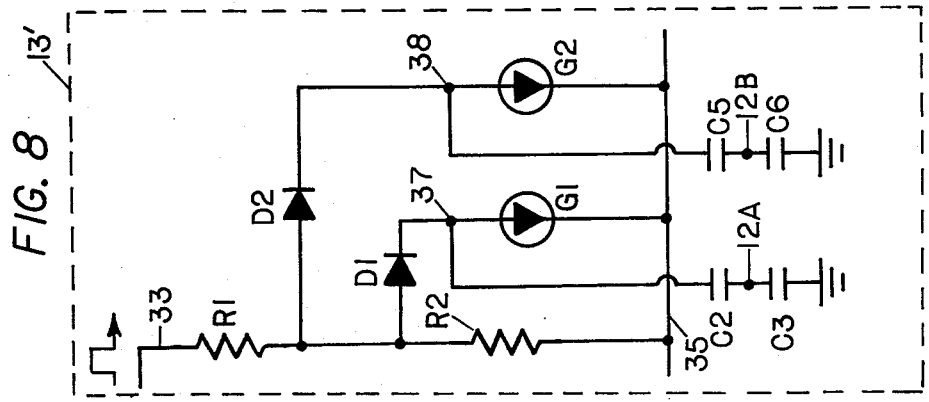
FIG. 8 shows the modification to the circuit in FIG. 2 which is used with the displacement probe in FIG. 7 when sensing linear displacement.

FIG. 8 exhibits a modified "general displacement" sensor circuit, 13', to be substituted for the "general displacement" sensor circuit, 13 in FIG. 2 when the probe shown in FIG. 7 is used to sense linear displacement. In this case, the center conductor, 12A, of FIG. 7 is connected to the node 12A in FIG. 8 in place of $C_3$ and the driven shield terminal 14A of FIG. 7 is connected to the shield driver terminal 14A of FIG. 2. The following description of circuit action applies when 13' is substituted for 13 in FIG. 2. The voltage $V_{37}$ appearing at node 37 is shown in FIG. 11. Over the time interval $t_0 < t < t_1$, corresponding to the positive part of each pulse at 33, the voltage is constant ($V_{37} = V_0$). During the interval $t_1 < t < t_1 + T$, corresponding to the negative part of each pulse at 33, the voltage decays substantially linearly as $$V_{37} = V_0 - \frac{I_0}{C}(t - t_1), (t_1 < t < t_1 + T)$$

where and $I_0$ is current arising from action of each of the current generators $G1$ and $G2$ is as described above.

In a manner similar to that described above with reference to FIG. 2, the voltages $V_{37}$, $V_{38}$ are passed to the first differential amplifier 15 and the difference signal is integrated to yield a signal proportional to:

$$\int_{t_1}^{t_1 + T} [V_{37}(t) - V_{38}(t)] \, dt$$

-continued $$\int_{t_1}^{t_1 + T} [(V_0 - \frac{I_0}{C} t) - (V_0 - \frac{I_0}{C'} t)] \, dt = I_0(\frac{1}{C} - \frac{1}{C'})\frac{T^2}{2}$$

This last expression is proportional to (1/C − 1/C') and therefore is proportional to D − D$_0$, where D is (variable) displacement of the probe shown in FIG. 7 and D$_0$ is a reference displacement determined by the capacitor C6 (or its equivalent) of FIG. 2.

FIG. 9 illustrates a third alternative embodiment, wherein rotational displacement of a body constrained to rotate about a fixed axis may be measured. A central cylindrical guide rod 91, electrically conducting and grounded, is constrained to rotate about the cylinder axis. An annular segment 92, surrounding and coaxial with the rod 91, is in frictional and electrical contact with the rod so that as the rod rotates the annular segment also rotates by the same amount. A second annular segment 93, surrounding and coaxial with the rod 91, is also in frictional and electrical contact with the rod. The outer radius of the annular segment 93 is substantially larger than the outer radius of the annular segment 92, and the half sleeve 93 is constructed of electrically conducting material such as iron. Coaxial with and surrounding the rod 91 and segments 92 and 93 are two annular sectors 95A and 95B, also constructed of electrically conducting material and radially spaced apart from the rod and annular segments. Typically, the radial gap between segments 93 and either annular sector 95A or 95B, might be 0.070 inches. The annular sectors are fixed in position while the rod 91 and annular segments 92 and 93 attached to the rod are free to rotate about the central axis. Although the segments 92 and 93 and the annular sectors 95A and 95B are shown in FIG. 9 as subtending angles substantially equal to 180° = 360°/2, these components may be constructed so as to subtend a smaller angle 360°/n (n>2 and not necessarily integral); with this modification, the sensitivity of this embodiment is increased at the expense of a reduced angular range of the angular variable θ.

Probe wires 12A and 12B are electrically connected to the annular sectors 95A and 95B, respectively, as shown. The probe wires are each surrounded by a coaxial shield (not shown) connected to the shield driver leads 14A and 14B of FIG. 2, and said probe wires are also electrically connected to the circuit of FIG. 2 at leads 12A and 12B.

The capacitance between each of the annular sectors 95A and 95B and the annular segment 93 varies approximately linearly with the angle of rotation θ (one capacitance increasing linearly and the other capacitance decreasing linearly with θ) of the rod in a well-known manner, the capacitance increasing with the increase in the proportion of electrically conducting material of the annular segment 93 which lies adjacent to the particular annular sector 95A or 95B. The annular sectors 95A and 95B and the annular segment 93 play the role of and replace the capacitances C3 and C6 of FIG. 2.

FIG. 10 shows a fourth alternative embodiment of the sensing apparatus, wherein the ambient moisture content of the environment may be measured. Two parallel plates 101 and 103, constructed of electrically conducting material, are in contact with and separated by a third plate 105 which is constructed of a moisture-absorbent dielectric whose dielectric permittivity varies approximately linearly with moisture absorbed; an example of such a dielectric material is a sponge. The upper and lower plates 101 and 103 may have many holes, such as the hole 107 drilled therethrough, to allow the ambient moisture to contact and be absorbed by the moisture-absorbent dielectric plate 105. After some period of time, which may be several minutes to a few hours, the dielectric plate 105 comes to equilibrium with the surrounding medium with respect to moisture content. One of the plates, say 103, is grounded, the potential on the other plate 101 occurs at some value determined by the remainder of the "general displacement" sensor circuit at lead 12A, and the capacitance of the structure (101, 103 and the dielectric plate 105 therebetween) is measured.

In this embodiment, the plates 101, 103, and 105 collectively play the roll of the capacitor C3 in FIG. 2, with the capacitance associated with lead 12A sensed by the remainder of the "general displacement" sensor circuit 13 of FIGS. 1 and 2. A second combination of three plates (not shown), namely two parallel electrically conducting plates in contact with and separated by a plate of the same size and material as plate 105, is kept in a vacuum or controlled moisture environment (such as a thoroughly dry environment) and is used as a reference probe. The reference capacitance appears at lead 12B (not shown) of one electrically conducting plate with the other being grounded. The capacitance at lead 12B thus functions as a reference moisture content.

With the exception of the linear displacement sensor 13' embodied in FIG. 7 (requiring merely the replacement of each of two parallel RC networks by a current generator therein) all of the embodiments (pourable material level sensor, linear and rotational displacement sensors, ambient moisture sensor) utilize the same circuits, shown in FIGS. 2, 4 and 5; these circuits are thus a unifying feature of the various embodiments of the invention disclosed herein.

Although the best modes contemplated for practicing the invention have been herein shown and described, it will be apparent that modification and variation may be made without departing from what is regarded to be the subject matter of the invention.

We claim:
1. Apparatus for sensing level of pourable material in a container, the apparatus comprising:
pulse generation means for producing a sequence of voltage pulses, spaced in time, of substantially identical magnitude and duration;
resistive-capacitive circuit means, operatively associated with the pulse generation means, and having a probe which includes at least one probe capacitor immersed in the pourable material, for producing a signal indicative of level of pourable material in the container;
second resistive-capacitive circuit means, operatively associated with the pulse generation means, for producing a reference signal indicative of a reference level in the container;
amplification means for amplifying the pourable material level signal and the reference signal, producing an amplified pourable material level signal and an amplified reference signal;
integration means for generating a time-integrated difference signal of the amplified pourable material level signal and the amplified reference signal;

output means, operatively associated with the integration means, for producing an output signal proportional to a mathematical function of the pourable material level in the container;

shield driver means for reducing the effects of extraneous capacitance developed by the probe of the first resistive-capacitive circuit means, the shield driver being operatively associated with the probe of the first resistive-capacitive circuit means; and the probe including a three-conductor cable, with one conductor electrically connected to the probe capacitor immersed in the pourable material, with a second conductor surrounding the first conductor and being electrically connected to the shield driver means, and with a third conductor surrounding the second conductor and being electrically grounded.

2. Apparatus according to claim 1, wherein said second resistive-capacitive circuit means is identical with said first resistive-capacitive circuit means, with said capacitor of said second resistive-capacitive circuit means being immersed in the pourable material at a reference level.

3. Apparatus according to claim 1, further including second amplification means, operatively associated with said first amplification means, for amplifying said once-amplified pourable material level signal and said once-amplified reference signal received from said first amplification means to produce a twice-amplified pourable material level signal and a twice-amplified reference signal, the second amplification means being operatively associated with said output means.

4. Apparatus according to claim 3, further including second integrator means, operatively associated with said first integrator means, for generating the time integral of said time-integrated difference signal, the second integrator means being operatively associated with said output means.

5. Apparatus according to claim 3, further including third amplification means, operatively associated with said second amplification means, for amplifying said twice-amplified pourable material level signal and said twice-amplified reference signal to product a thrice-amplified, pourable material level signal and a thrice-amplified reference signal, the third amplification means being operatively associated with said output means.

6. Apparatus according to claim 1, wherein said output signal produced by said output means varies substantially linearly in magnitude with the level of pourable material in the container.

7. Apparatus according to claim 1, wherein said pulse generation means and said first resistive-capacitive circuit means produce a time-periodic potential across said probe capacitor of said first resistive-capacitive circuit means which, within each period, varies with time substantially as $$V(t) = V_0, \ (t_0 < t < t_1) = V_0 + (V_0 - V_1)e^{-\alpha(t - t_1)} (t_1 < t < t_1 + T),$$

wherein exponent $\alpha$ is dependent upon the capacitance sensed by said probe capacitor and said first resistive-capacitive circuit means has a period coefficient K, defined as $$K = \frac{2T}{(\frac{1}{\alpha_{max}}) + (\frac{1}{\alpha_{min}})}$$

which lies in the range $2 < K < 4$, with $\alpha_{min}$ and $\alpha_{max}$ being the minimum and maximum values, respectively, of the exponent $\alpha$ as the capacitance of said probe capacitor is varied over it sallowed range of values, and with $V_0$, $V_1$, $t_0$, $t_1$ and T being otherwise arbitrary real numbers.

8. Apparatus for sensing ambient moisture content, the apparatus comprising:

pulse generation means for producing a sequence of voltage pulses, spaced in time, of substantially identical magnitude and duration;

resistive-capacitive means, operatively associated with the pulse generation means, having a probe which includes at least one moisture-sensing probe capacitor with its two plates separated by a moisture-absorbent, moisture-sensitive dielectric, for producing a signal indicative of moisture content of the dielectric;

second resistive-capacitive means, operatively associated with the pulse generation means, for producing a reference signal indicative of a reference level of ambient moisture content;

amplification means for amplifying the dielectric moisture content signal and the reference signal to produce an amplified dielectric moisture content signal and an amplified reference signal;

integration means for generating a time-integrated difference signal of the amplified dielectric moisture content signal and the amplified reference signal;

output means, operatively associated with the amplifying means, for producing a signal proportional to a mathematical function of the dielectric moisture content;

shield driver means for reducing the effects of extraneous capacitance developed by the probe of the first resistive-capacitive circuit means, the shield driver being operatively associated with the probe of the first resistive-capacitive circuit means; and the probe including a three-conductor cable, with one conductor electrically connected to the probe capacitor with moisture-sensitive dielectric, with a second conductor surrounding the first conductor and being electrically connected to the shield driver means, and with a third conductor surrounding the second conductor and being electrically grounded.

9. Apparatus according to claim 8, wherein said second resistive-capacitive circuit means is identical with said first resistive-capacitive circuit means, with the plates of said capacitor of said second resistive-capacitive means being separated by a moisture-absorbent, moisture-sensitive dielectric with a reference level of moisture maintained therein.

10. Apparatus according to claim 8, further including second amplification means, operatively associated with said first amplification means, for amplifying said once-amplified dielectric moisture content signal and said once-amplified reference signal received from said first amplification means to produce a twice-amplified dielectric moisture content signal and a twice-amplified reference signal, the second amplification means being operatively associated with said output means.

11. Apparatus according to claim 10, further including second integrator means, operatively associated with said first integrator means, for generating the time integral of said time-integrated difference signal, the second integrator means being operatively associated with said output means.

12. Apparatus according to claim 10, further including third amplification means, operatively associated with said second amplification means, for amplifying said twice-amplified dielectric moisture content signal and said twice-amplified reference signal to produce a thrice-amplified reference signal, the third amplification means being operatively associated with said output means.

13. Apparatus according to claim 8, wherein said output signal produced by said output means varies substantially linearly in magnitude with the moisture content of the moisture-absorbent, moisture-sensitive dielectric.

14. Apparatus according to claim 8, wherein said pulse generation means and said first resistive-capacitive circuit means produce a time-periodic potential across said probe capacitor of said first resistive-capacitive circuit means which, within each period, varies with time substantially as $$V(t) = V_0, (t_0 < t < t_1) = V_0 + (V_0 - V_1)e^{-\alpha(t-t_1)}(t_1 < t < t_1 + T),$$

where exponent $\alpha$ is dependent upon the capacitance sensed by said probe capacitor and said first resistive-capacitive circuit means has a period coefficient K, defined as $$K = \frac{2T}{(\frac{1}{\alpha_{max}}) + (\frac{1}{\alpha_{min}})}$$

which lies in the range $2 < K < 4$, with $\alpha_{min}$ and $\alpha_{max}$ being the minimum and maximum values, respectively, of the exponent $\alpha$ as the capacitance of said probe capacitor is varied over its allowed range of values, and with $V_0$, $V_1$, $t_0$, $t_1$ and T being otherwise arbitrary real numbers.

15. Apparatus for sensing rotational displacement of an object which is constrained to rotate in a plane about a fixed axis, the apparatus comprising:
pulse generation means for producing a sequence of voltage pulses, spaced in time, of substantially identical magnitude and duration;
resistive-capacitive circuit means, operatively associated with the pulse generation means, for producing a signal indicative of an angle of rotation of the object, and having a probe which includes at least one probe capacitor having two capacitor plates which are coaxial annular segments, the plates being radially spaced apart by a gap with one capacitor plate being mechanically connected with the object and disposed to rotate about the fixed axis with the object so as to maintain the gap between the two capacitor plates while allowing the angle of rotation between the two capacitor plates to vary;
second resistive-capacitive means, operatively associated with the pulse generation means, for producing a reference signal indicative of a reference level of angular rotation of the object;
amplification means for amplifying the object angular rotation signal and the reference signal to produce an amplified dielectric moisture content signal and an amplified reference signal;
integration means for generating a time-integrated difference signal of the amplified object angular rotation signal and amplified reference signal;
output means, operatively associated with the amplifying means, for producing an output signal proportional to a mathematical function of the angle of rotation of the object;
shield driver means for reducing the effects of extraneous capacitance developed by the probe of the first resistive-capacitance circuit means, the shield driver being operatively associated with the probe of the first resistive-capacitive circuit means; and
the probe including a three-conductor cable, with one conductor electrically connected to the probe capacitor which senses angular rotation, with a second conductor surrounding the first conductor and being electrically connected to the shield driver means, and with a third conductor surrounding the second conductor and being electrically grounded.

16. Apparatus according to claim 15, wherein said second resistive-capacitive circuit means is identical with said first resistive-capacitive circuit means, with the angle of rotation of one capacitor plate relative to the other capacitor plate within said second resistive-capacitive circuit means being fixed at a reference value of rotational displacement.

17. Apparatus according to claim 15, further including second amplification means, operatively associated with said first amplification means, for amplifying said once-amplified reference signal received from said first amplification means to produce a twice-amplified object angular rotation signal and a twice-amplified reference signal, the second amplification means being operatively associated with said output means.

18. Apparatus according to claim 17, further including second integrator means, operatively associated with said first integrator means, for generating the time integral of said time-integrated difference signal, the second integrator means being operatively associated with said output means.

19. Apparatus according to claim 17, further including third amplification means, operatively associated with said second amplification means, for amplifying said twice-amplified object angular rotation signal and said twice-amplified reference signal to produce a thrice-amplified object angular rotation signal and a thrice-amplified reference signal, the third amplification means being operatively associated with said output means.

20. Apparatus according to claim 15, wherein said output signal produced by said output means varies substantially linearly in magnitude with the angle of rotation of the object.

21. Apparatus according to claim 15, wherein said pulse generation means and said first resistive-capacitive circuit means produce a time-periodic potential across said probe capacitor of said first resistive-capacitive circuit means which, within each period, varies with time substantially as $$V(t) = V_0, (t_0 < t < t_1) = V_0 + (V_0 - V_1)e^{-\alpha(t-t_1)}(t_1 < t < t_1 + T),$$

where exponent $\alpha$ is dependent upon the capacitance sensed by said probe capacitor and said first resistive-capacitive circuit means has a period coefficient K, defined as $$K = \frac{2T}{(\frac{1}{\alpha_{max}}) + (\frac{1}{\alpha_{min}})}$$

which lies in the range $2<K<4$, with $\alpha_{min}$ and $\alpha_{max}$ being the minimum and maximum values, respectively, of the exponent $\alpha$ as the capacitance of said probe capacitor is varied over its allowed range of values, and with $V_0$, $V_1$, $t_0$, $t_1$ and T being otherwise arbitrary real numbers.

22. Apparatus for sensing linear displacement of an object which is constrained to move only in one linear direction, the apparatus comprising:
  pulse generation means for producing a sequence of voltage pulses, spaced in time, of substantially identical magnitude and duration;
  resistive-capacitive circuit means, operatively associated with the pulse generation means, for producing a signal indicative of a linear displacement of the object, and having a probe which includes at least one probe capacitor having two capacitor plates, spaced apart by a gap, with one capacitor plate mechanically connected to the object and disposed to move linearly with the object so as to maintain the gap between the two capacitor plates while allowing linear displacement between the two capacitor plates to vary;
  second resistive-capacitive circuit means, operatively associated with the pulse generation means, for producing a reference signal indicative of a reference level of linear displacement of the object;
  amplification means for amplifying the object linear displacement signal and the reference signal, producing an amplified object linear displacement signal and an amplified reference signal;
  integration means for generating a time-integrated difference signal of the amplified object linear displacement signal and amplified reference signal;
  output means, operatively associated with the amplifying means, for producing an output signal proportional to a mathematical functional of the linear displacement of the object;
  shield driver means for reducing the effects of extraneous capacitance developed by the probe of the first resistive-capacitive circuit means, the shield driver being operatively associated with the probe of the first resistive-capacitive circuit means; and
  the probe including a three-conductor cable, with one conductor electrically connected to the probe capacitor which moves with the object, with a second conductor surrounding the first conductor and being electrically connected to the shield driver means, and with a third conductor surrounding the second conductor and being electrically grounded.

23. Apparatus according to claim 22, wherein said second resistive-capacitive circuit means is identical with said first resistive-capacitive circuit means, with the linear displacement of a capacitor plate relative to the other capacitor plate within said second resistive-capacitive circuit means being fixed at a reference value of linear displacement.

24. Apparatus according to claim 22, further including second amplification means, operatively associated with said first amplification means, for amplifying said once-amplified object linear displacement signal and said once-amplified reference signal received from said first amplification means to produce a twice-amplified object linear displacement signal and a twice-amplified reference signal, the second amplification means being operatively associated with said output means.

25. Apparatus according to claim 24, further including second integrator means, operatively associated with said first integrator means, for forming the time integral of said time-integrated difference signal, the second integrator means being operatively associated with said output means.

26. Apparatus according to claim 24, further including third amplification means, operatively associated with said second amplification means, for amplifying said twice-amplified object linear displacement signal and said twice-amplified reference signal and a thrice-amplified reference signal, the third amplification means being operatively associated with said output means.

27. Apparatus according to claim 22, wherein said output signal produced by said output means varies substantially linearly in magnitude with the linear displacement of the object.

28. Apparatus according to claim 22, wherein said pulse generation means of said first resistive-capacitive circuit means produce a time-periodic potential across said probe capacitor of said first resistive-capacitive circuit means which, within each period, varies with time substantially as $$V(t) = V_0 \ (t_0 < t < t_1) = V_0 + (V_0 - V_1)e^{-\alpha(t-t_1)} (t_1 < t < t_1 + T),$$

where exponent $\alpha$ is dependent upon the capacitance sensed by said probe capacitor and said first resistive-capacitive circuit means has a period coefficent K, defined as $$K = \frac{2T}{(\frac{1}{\alpha_{max}}) + (\frac{1}{\alpha_{min}})}$$

which lies in the range $2<K<4$, with $\alpha_{min}$ and $\alpha_{max}$ being the minimum and maximum values, respectively, of the exponent $\alpha$ as the capacitance of said probe capacitor is varied over its allowed range of values, and with $V_0$, $V_1$, $t_0$, $t_1$ and T being otherwise arbitrary real numbers.

29. Apparatus for sensing linear displacement of an object which is constrained to move in only one linear direction, the apparatus comprising:
  pulse generation means for producing a sequence of voltage pulses, spaced in time, of substantially identical magnitude and duration;
  current generator-capacitive circuit means, operatively associated with the pulse generation means, having a probe which includes at least one probe capacitor with two capacitor plates separated by a gap, one capacitor plate being mechanically connected with the object so as to allow the distance across the capacitor gap to change and to move in a linear direction in response to linear displacement of the object, for producing a signal indicative of the reciprocal of linear displacement of the object;
  second current generator-capacitive circuit means, operatively associated with the pulse generation means, for producing a reference signal indicative of a reference level of the reciprocal of linear displacement of the object;
  amplification means for amplifying the object linear displacement signal and the reference signal to produce an amplified object linear displacement signal and an amplified reference signal.

integration means for generating a time-integrated difference signal of the amplified object linear displacement signal and the amplified reference signal;

output means, operatively associated with the amplifying means, for producing an output signal proportional to a mathematical function of the magnitude of the linear displacement of the object;

shield driver means, operatively associated with the probe of the first current generator-capacitive circuit means, for reducing the effects of extraneous capacitance developed by the probe of the first current generator-capacitive circuit means; and the probe including a three-conductor cable, with one conductor electrically connected to the probe capacitor which moves with the object with a second conductor surrounding the first conductor and being electrically connected to the shield driver means, and with a third conductor surrounding the second conductor and being electrically grounded.

30. Apparatus according to claim 29, wherein said second current generator-capacitive circuit means is identical with said first current generator-capacitive means, with one of said capacitor plates of said capacitor of said second current generator-capacitive circuit means being held at a reference distance from the other of said capacitor plates of said capacitor of said second current generator-capacitve circuit means.

31. Apparatus according to claim 29, further including second amplification means, operatively associated with said first amplification means, for amplifying said once-amplified object linear displacement signal and said once-amplified reference signal received from said first amplification means to produce a twice-amplified object linear displacement signal and a twice-amplified reference signal, the second amplification means being operatively associated with said output means.

32. Apparatus according to claim 31, further including second integrator means, operatively associated with said first integrator means, for generating the time integral of said time-integrated difference signal, the second integrator means being operatively associated with said output means.

33. Apparatus according to claim 32, further including third amplification means, operatively associated with said second amplification means, for amplifying said twice-amplified object linear displacement signal and said twice-amplified reference signal to produce a thrice-amplified object linear displacement signal and a thrice-amplified reference signal, the third amplification means being operatively associated with said output means.

34. Apparatus according to claim 29, wherein said output signal produced by said output means varies substantially linearly in magnitude with the linear displacement of the object.

35. Apparatus according to claim 29, wherein said pulse generation means and said first current generator-capacitive circuit means produces a time-periodic potential across said probe capacitor of said first current generator-capacitive circuit means which varies with time substantially as $$V(t) = V_0 (t_0 < t < t_1) \quad V(t) = V_0 - (I_0/C)(t - t_1)$$
$$(t_1 < t < t_1 + T),$$

and with C being the capacitance being measured and with $V_0$, $I_0$, $t_1$ and $T$ otherwise arbitrary real numbers.

36. Apparatus according to claim 1, wherein said shield driver means is circuit means for causing the electric potential on the second conductor on the probe to be substantially equal to the electric potential across said probe capacitor immersed in the pourable material.

37. Apparatus according to claim 8, wherein said shield driver means is circuit means for causing the electric potential on the second conductor on the probe to be substantially equal to the electric potential across said probe capacitor with the moisture-sensitive dielectric.

38. Apparatus according to claim 15, wherein said shield driver means is circuit means for causing the electric potential on the second conductor on the probe to be substantially equal to the electric potential across said probe capacitor which senses angular rotation.

39. Apparatus according to claim 22, wherein said shield driver means is circuit means for causing the electric potential on the second conductor on the probe to be substantially equal to the electric potential across said probe capacitor which moves with the object.

40. Apparatus according to claim 29, wherein said shield driver means is circuit means for causing the electric potential on the second conductor on the probe to be substantially equal to the electric potential across said probe capacitor which moves with the object.

* * * * *